United States Patent
Mbekeani

(10) Patent No.: US 9,251,703 B1
(45) Date of Patent: Feb. 2, 2016

(54) METHODS OF PROVIDING TRAFFIC INFORMATION AND SUPPORTING APPARATUS, READABLE MEDIUM, AND MEMORY

(75) Inventor: Lumumba Mbekeani, Oak Park, IL (US)

(73) Assignee: HERE Global B.V., Veldhoven (NL)

( * ) Notice: Subject to any disclaimer, the term of this patent is extended or adjusted under 35 U.S.C. 154(b) by 611 days.

(21) Appl. No.: 11/522,670

(22) Filed: Sep. 18, 2006

(51) Int. Cl.
*G08G 1/0967* (2006.01)
*G08G 1/09* (2006.01)

(52) U.S. Cl.
CPC .............. *G08G 1/0967* (2013.01); *G08G 1/091* (2013.01)

(58) Field of Classification Search
CPC .......... G08G 1/0967; G08G 1/096716; G08G 1/091; G08G 1/0104; G08G 1/0125; G08G 1/0129
USPC ...................... 340/905, 995.13; 701/117–119
See application file for complete search history.

(56) References Cited

U.S. PATENT DOCUMENTS

| | | | |
|---|---|---|---|
| 5,689,252 A * | 11/1997 | Ayanoglu et al. ............. | 340/991 |
| 5,889,477 A * | 3/1999 | Fastenrath .................... | 340/905 |
| 6,477,459 B1 | 11/2002 | Wunderlich .................. | 701/209 |
| 6,618,667 B1 | 9/2003 | Berwanger et al. ........... | 701/117 |
| 6,813,247 B1 * | 11/2004 | Hassan .......................... | 370/252 |
| 6,950,745 B2 | 9/2005 | Agnew et al. ................. | 701/210 |
| 7,307,513 B2 * | 12/2007 | Shutter et al. ............ | 340/995.13 |
| 2005/0222761 A1 | 10/2005 | Uyeki et al. .................. | 701/209 |
| 2005/0231394 A1 * | 10/2005 | Machii et al. ............ | 340/995.13 |
| 2006/0111833 A1 * | 5/2006 | Feldman et al. .............. | 701/117 |
| 2006/0178807 A1 * | 8/2006 | Kato et al. ..................... | 701/117 |
| 2007/0273559 A1 * | 11/2007 | Furuya et al. ............ | 340/995.13 |

* cited by examiner

*Primary Examiner* — Steven Lim
*Assistant Examiner* — Hongmin Fan
(74) *Attorney, Agent, or Firm* — Lempia Summerfield Katz LLC

(57) ABSTRACT

A technique of providing traffic information to a navigation system that obtains (704) current traffic data having a current traffic condition associated with a location description on a road network. Historic traffic data associated with the location description are then obtained (708) from a historic traffic database to be compared (710) with the current traffic data. From the comparison, a traffic delta between the current traffic data and the historic traffic data is then provided (710), which is used to determine (714) whether this traffic delta corresponds in a predetermined way with a threshold. And if so, a traffic message is generated (716) with the current traffic condition associated with the location description.

10 Claims, 11 Drawing Sheets

METHODS OF PROVIDING TRAFFIC INFORMATION AND SUPPORTING APPARATUS, READABLE MEDIUM, AND MEMORY

BACKGROUND

The present invention relates generally to a technique of providing traffic information, and more particularly to a technique of providing traffic information on a navigation system via wireless channels.

In some metropolitan areas and countries, systems have been implemented for broadcasting data messages that contain up-to-the-minute reports of traffic and road condition information. These systems broadcast the data messages on a continuous, periodic, or frequently occurring basis. Receivers decode the data messages and provide the up-to-the-minute reports of traffic and road information.

The traffic data message broadcast systems have several advantages over radio stations simply broadcasting audio traffic reports. For example, with the traffic data message broadcasting systems, a driver can quickly obtain the traffic information. The driver does not have to wait until the radio station broadcasts a traffic report. Another advantage of the traffic data message broadcast systems is that the driver does not have to listen to descriptions of traffic conditions for areas remote from his or her location. Another advantage of traffic data message broadcast systems is that more detailed and possibly more up-to-date information can be provided. In these types of systems, the data messages conform to one or more pre-established specifications or formats. The in-vehicle receivers decode the traffic data messages using the pre-established specifications or formats.

One system for broadcasting traffic and road condition information is the Radio Data System-Traffic Message Channel ("RDS-TMC") (or RBDS in North America). The RDS-TMC system is used in North America and some European countries. RDS-TMC messages are broadcast regularly or at varying intervals. Another traffic system named Vehicle Information and Communication System ("VICS") Center is also used in Japan. In the current system, these traffic data messages are broadcast continuously to provide the drivers with updated current traffic conditions. One consideration is that the traffic data messages are broadcast regardless of whether there is a delay on the road segment. The current traffic systems, thus, can be improved to efficiently and effectively provide updated current traffic conditions, while conserving transmission bandwidths and resources.

SUMMARY OF THE INVENTION

To address these and other objectives, the present invention provides, according to one embodiment, a method of providing traffic information to a navigation system that obtains current traffic data having a current traffic condition associated with a location description on a road network. Historic traffic data associated with the location description are then obtained from a historic traffic database to be compared with the current traffic data. A traffic delta between the current traffic data and the historic traffic data is then provided, which is used to determine whether this traffic delta corresponds in a predetermined way with a threshold. And if so, a traffic message is generated with the current traffic condition associated with the location description. According to one embodiment, the method is implemented at the server side of a traffic service network. In one specific embodiment, the traffic message is accordingly provided for broadcast to the navigation systems. According to another embodiment, the current traffic data is further saved to the historic traffic database. For one embodiment, a time stamp of the current traffic condition is obtained, wherein the historic traffic data is associated with the time stamp. A location reference code associated with the location description is further obtained, wherein the current traffic condition is associated with the location reference code.

According to another embodiment, a method of providing traffic information on a navigation system is provided with a determination as to whether a traffic message has been received, wherein the traffic message includes a current traffic condition. If the traffic message has been received, the current traffic condition from the message is provided on the navigation system. Otherwise, if no traffic message has been received, historic traffic data from a historic traffic database are provided on the navigation system. Specifically, in one embodiment, this method is implemented at the client side of a traffic service network. Based on another embodiment, a current time and a current location of the vehicle are further obtained, wherein at least one of the current traffic data and the historic traffic data are based, at least in part, on the current time and the current location of the vehicle. A location reference code, according to an embodiment, is further obtained from the traffic message, wherein the current traffic condition is based, at least in part, upon the location reference code.

For one embodiment, the current traffic condition is also obtained from the traffic message. In a particular embodiment, the current traffic data having the current traffic condition is obtained from the traffic message. In an alternative embodiment, the current traffic condition being obtained from the traffic message further includes obtaining a traffic delta between the current traffic data and the historic traffic data, wherein the current traffic condition is based, at least in part, upon the historic traffic data and the traffic delta.

According to another embodiment, an apparatus for providing traffic information on a navigation system is included. The apparatus includes a communication system for receiving current traffic data having a current traffic condition, a memory for storing a historic traffic database having historic traffic data, and a traffic program operably coupled to the communication system and the memory, wherein the traffic program compares the current traffic data with the historic traffic data to provide a traffic delta and generates a traffic message having the current traffic condition for transmission on the navigation system when the traffic delta corresponds in a predetermined way with a threshold.

According to one embodiment, an apparatus for providing traffic information is included. The apparatus includes a receiver for receiving a traffic message having a current traffic condition and a memory for storing a historic traffic database having historic traffic data. A program operably coupled to the memory and the receiver is further provided, wherein the program provides the current traffic condition when the traffic message is received by the receiver and provides historic traffic data when the traffic message is not received by the receiver. A user interface operably coupled to the program is further included for displaying the current traffic condition and the historic traffic data to a user.

According to yet another embodiment, a memory having a data structure is provided. The data structure includes a first field having a location reference code associated with a location description on a road segment assigned by a traffic message supplier and a second field having a traffic delta representing a difference between current traffic data and historic traffic data associated with the location reference code. In one specific embodiment, a third field having a time stamp associated with the traffic delta is further included.

In one embodiment, a system for providing traffic information on a navigation system is further included. The system includes a central facility that provides a traffic message having a current traffic condition, which is sent when a traffic delta between current traffic data and historic traffic data corresponds in a predetermined way with a threshold. In addition, a navigation system is further included for displaying the historic traffic data stored on a historic traffic database unless the traffic message having the current traffic condition is received from the central facility.

In various embodiments, the traffic delta corresponds in a predetermined way with a threshold when there is a difference between the traffic delta and the threshold, the traffic delta being greater than the threshold, the traffic delta being less than the threshold, the traffic delta being at least equal to the threshold, and/or the traffic delta being within a range of the threshold. For one embodiment, the threshold includes a predefined constant value, a minimum value, a maximum value, an average value, a median value, a variance, and auto covariance. In other embodiments, the location reference code may include a geographic location, a point of interest, and a local location of a geographic location. According to other embodiments, the current traffic condition is represented by the current traffic data or the traffic delta. Still in other embodiments, the traffic message is broadcast using any one or more selected from a group of Radio Data System (RDS), Traffic Message Channel (TMC), Radio Data System-Traffic Message Channel (RDS-TMC), Vehicle Information and Communication System, digital radio, satellite radio, mobile Internet, mobile paging, and General Packet Radio Services/Global System for Mobile (GPRS/GSM) phone networks. The traffic message, according to various embodiments, may use an Alert-C protocol, Alert-Plus protocol, packet-based protocol, and/or Vehicle Information and Communication System message protocol.

Through the embodiments of various teachings, an improved technique for providing traffic information is provided. With the use of the historic traffic data along with the traffic delta, unnecessary transmission of traffic messages are reduced. As a result, bandwidth and resources needed to provide the traffic information are conserved. Overall, traffic information is provided more efficiently and seamlessly.

BRIEF DESCRIPTION OF THE DRAWINGS

The accompanying figures, where like reference numerals refer to identical or functionally similar elements throughout the separate views and which together with the detailed description below are incorporated in and from part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are typically not depicted in order to facilitate a less obstructed view of these various embodiments of the present invention.

DETAILED DESCRIPTION

As required, detailed embodiments of the present invention are disclosed herein. It is to be understood, however, that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriate detailed structure. Further, the terms and phrases used herein are not intended to be limiting, but rather to provide an understandable description of the invention.

Moreover, the terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The terms "program," "software application," "firmware," "circuit," the like as used herein, are defined as a sequence of instructions designed for execution on a computer system. A program, computer program, software application, firmware, or circuit may include a subroutine, a function, a procedure, an object method, an object implementation, an executable application, an applet, a servlet, a source code, an object code, a shared library/dynamic load library and/or other sequence of instructions designed for execution on a computer system. Moreover, the term "obtain" is used to broadly describe the multiple exemplary computer functions of, but not limited to, accessing, extrapolating, collecting, calculating, computing, detecting, evaluating, determining, and/or searching. Another term "provide" is also used to broadly describe the multiple exemplary computer functions of, but again not limited to, displaying, outputting, and transmitting.

I. Traffic Information Broadcast System—Overview

Figure 1:
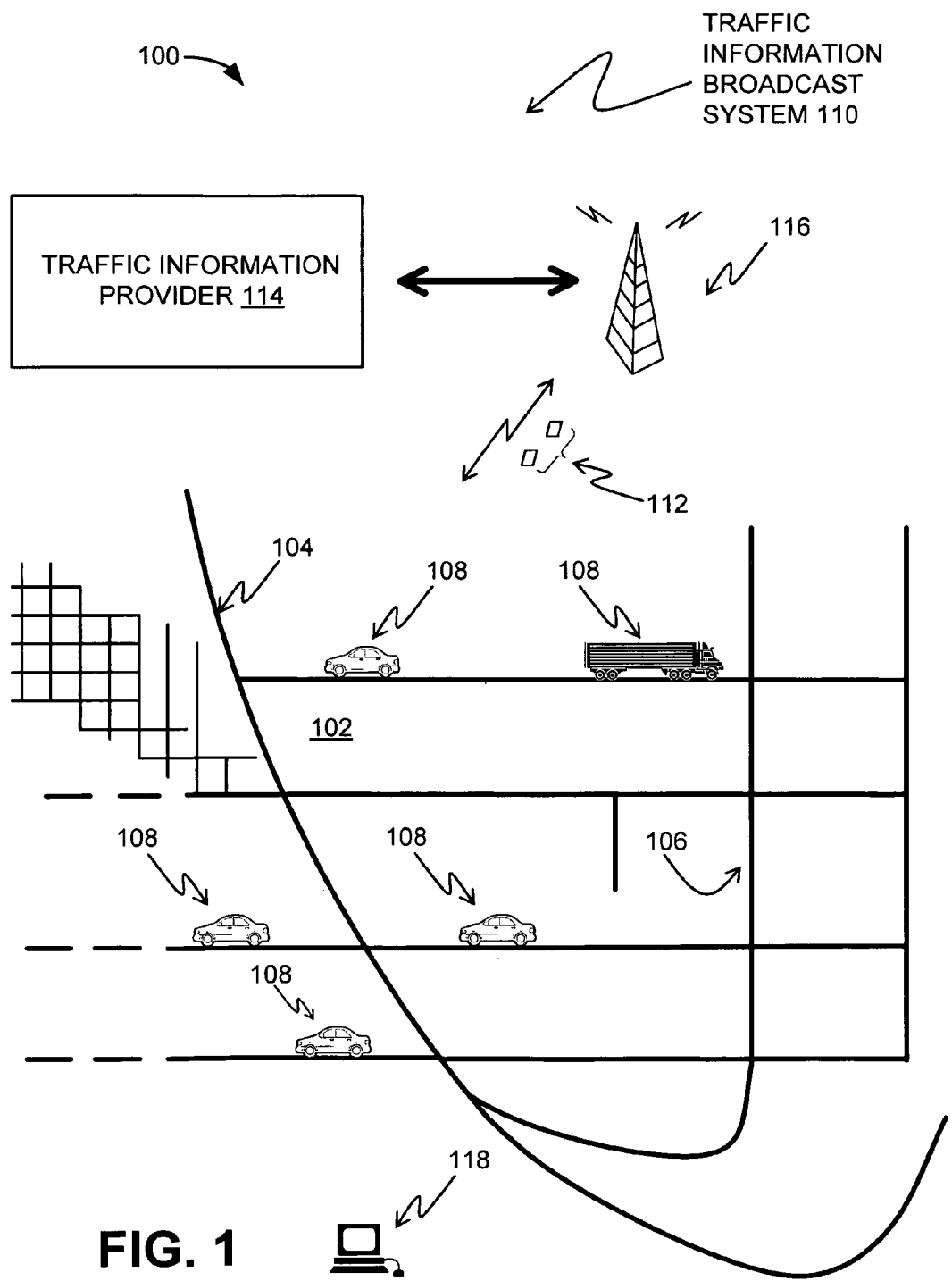
FIG. 1 is a diagram illustrating components of a traffic broadcast system in a geographic region.

For purposes of providing an illustrative but non-exhaustive example to facilitate this description, FIG. 1 shows a specific operational paradigm using a wireless communication system, which is indicated generally at 100. Those skilled in the art, however, will recognize and appreciate that the specifics of this illustrative example are not specifics of the invention itself and that the teachings set forth herein are applicable in a variety of alternative settings. These various platforms and communication implementations are, as a result, within the scope of the invention, and various embodiments for these multiple implementations are readily understood and appreciated by one skilled in the art. Moreover, although traffic information broadcast is used as a practical embodiment, the various embodiments contemplate other non-traffic broadcast systems, such as parking spot availability or gas price data.

Referring now to the exemplary communication network shown in FIG. 1, a diagram illustrating a geographic region 102 is shown. The geographic region 102 includes the road network 104 having multiple road segments 106 on which numerous vehicles 108 travel. The vehicles 108 may include cars, trucks, buses, bicycles, motorcycles, etc. The geographic region 102 may be a metropolitan area, such as the New York metropolitan area, the Chicago metropolitan area, or any other metropolitan area. Alternatively, the geographic region 102 may be a state, province, or country, such as California, Illinois, France, England, or Germany. Alternatively, the geographic region 102 can be a combination of one or more metropolitan areas, states, countries, and so on.

A traffic information broadcast system 110 broadcasts traffic messages 112 (two shown) regarding the traffic and road conditions on the road network 104 associated with a location description of the road network in the geographic region 102. A traffic information provider 114 operates the traffic information broadcast system 110. Some or all of the vehicles 108 include suitable equipment that enables them to receive the traffic messages 112 broadcasted by the traffic information broadcast system 110, via a transmission equipment 116. The traffic messages 112 may also be received and used in systems that are not installed in vehicles (e.g., "non-vehicles 118"). These non-vehicles 118 may include workstations, personal computers, personal digital assistants, networks, pagers, televisions, radio receivers, telephones, and so on. The non-vehicles 118 that receive the traffic messages 112 may obtain them in the same manner as the vehicles, i.e., by broadcast. Alternatively, the non-vehicles 118 may receive the traffic messages 112 by other means, such as over telephone lines, over the Internet, via cable, and so on. The systems in the vehicles 108 or in the non-vehicles 118 that receive the traffic messages 112 may include various different platforms as known to those skilled in the art. The various teachings also contemplate one-to-one communications, such as a cellular system. Thus, the term "broadcast" intends to cover both one-to-many communications and one-to-one communications.

Figure 2:
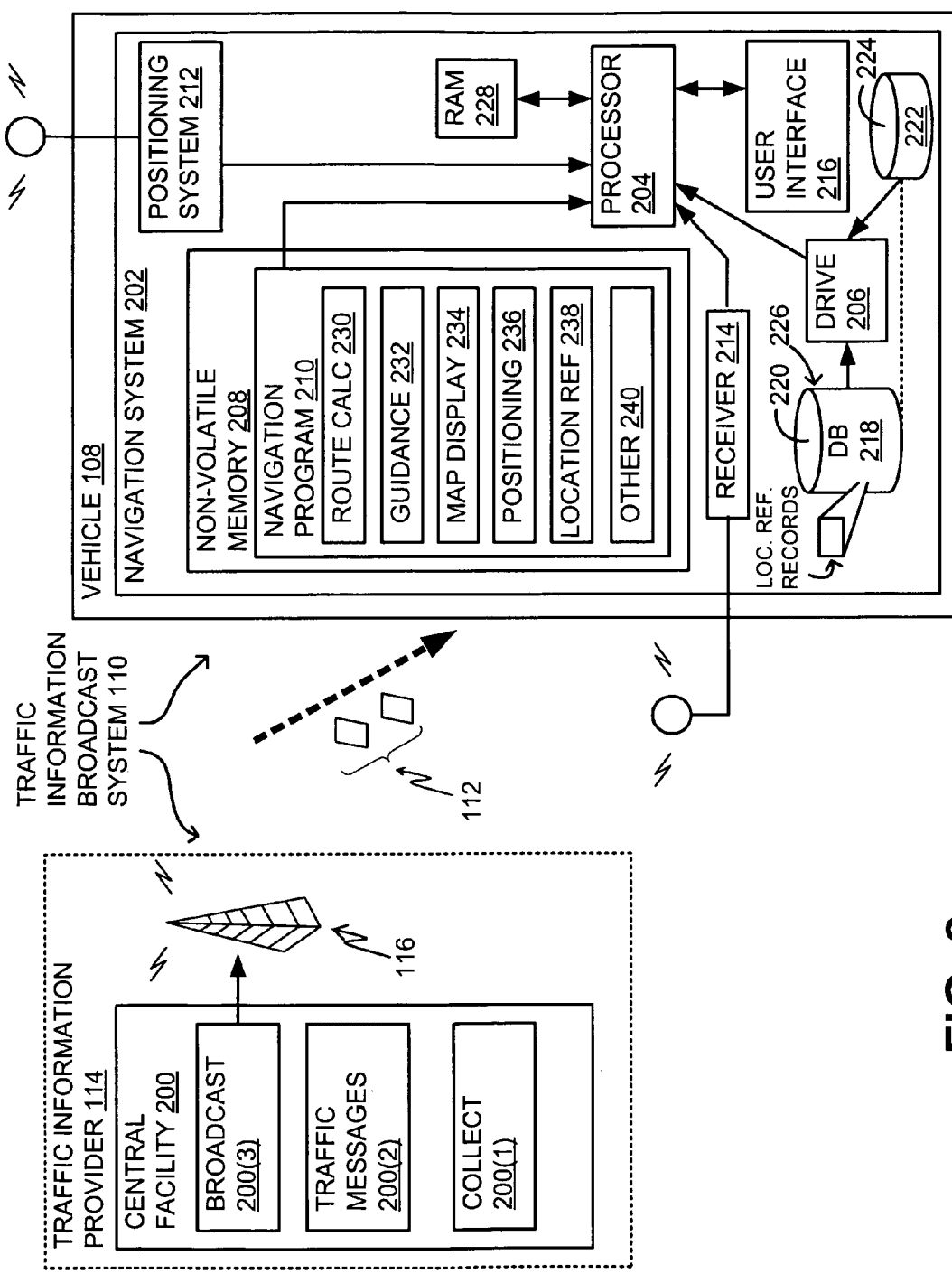
FIG. 2 is a block diagram illustrating components of the traffic broadcast system and one of the vehicles with an onboard navigation system, as shown in FIG. 1.

FIG. 2 shows diagrammatically the components of the traffic information broadcast system 110 and one of the vehicles 108 in FIG. 1. The traffic information broadcast system 110 provides for collecting data related to traffic and road conditions, developing traffic messages from the collected data, and transmitting the traffic messages 112 to the vehicles 108 and non-vehicles 118 in the region 102 on a regular and continuing basis.

The traffic information broadcast system 110 includes a central facility 200 operated by the traffic information' provider 114. The central facility 200 includes equipment and programming 200(1) for collecting the data related to traffic and road conditions in the region 102 from various sources or manual input. The central facility 200 also includes equipment and programming 200(2) for developing the traffic messages 112 from the collected traffic and road condition data. Accordingly, the central facility 200 further includes suitable equipment and programming 200(3) for broadcasting the traffic messages 112.

To broadcast the traffic messages 112, the traffic information broadcast system 110 broadcasts the traffic messages using the transmission equipment 116. The transmission equipment 116 may comprise one or more FM transmitters, including antennas, or other wireless transmitters. The transmission equipment 116 provides for broadcasting the traffic messages 112 throughout the region 102. The transmission equipment 116 may be part of the traffic information broadcast system 110, or alternatively, the transmission equipment 116 may use equipment from other types of systems, such as cellular or paging systems, satellite radio, FM radio stations, and so on, to broadcast traffic messages 112 to the vehicles 108 and non-vehicles 118 in the region 102. In one embodiment, the central facility 200 transmits the traffic messages 112 to a broadcaster that broadcasts the messages. (For purposes of this disclosure and the appended claims, the broadcasting of traffic messages is intended to include any form of transmission, including direct wireless transmission.)

Vehicles 108 and non-vehicles 118 in the region 102 have appropriate equipment for receiving the traffic messages 112. In one embodiment, installed in some of the vehicles 108 are a navigation system 202 that can receive and use the traffic messages 112. As shown in FIG. 2, the navigation system 202 is a combination of hardware and software components. In one embodiment, the navigation system 202 includes a processor 204, a drive 206 connected to the processor 204, and a non-volatile memory storage device 208 for storing navigation application software programs 210 and possibly other information. The processor 204 may be of any type used in navigation systems.

The navigation system 202 may also include a positioning system 212. The positioning system 212 may utilize GPS-type technology, a dead reckoning-type system, or combinations of these or other systems, all of which are known in the art. The positioning system 212 may include suitable sensing devices that measure the traveling distance speed, direction, and so on, of the vehicle. The positioning system 212 may also include appropriate technology to obtain a GPS signal, in a manner that is known in the art. The positioning system 212 outputs a signal to the processor 204. The navigation application software program 210 that is run on the processor 204 may use the signal from the positioning system 212 to determine the location, direction, speed, etc., of the vehicle 108.

Referring to FIG. 2, the vehicle 108 includes a traffic message receiver 214. The receiver 214 may be a satellite radio or FM receiver tuned to the appropriate frequency used by the traffic broadcast information system 110 to broadcast the traffic messages 112. The receiver 214 receives the traffic messages 112 from the traffic information provider 114. (In an alternative in which the traffic messages are sent by a direct wireless transmission, such as via a cellular wireless transmission, the receiver 214 in the vehicle 108 may be similar or identical to a cellular telephone.) The receiver 214 provides an output to the processor 204 so that appropriate programming in the navigation system 202 can utilize the traffic messages 112 broadcast by the traffic broadcast system 110 when performing navigation functions, as described more fully below.

The navigation system 202 also includes a user interface 216 that allows the end user (e.g., the driver or passengers) to input information into the navigation system. This input information may include a request to use the navigation features of the navigation system 202, which uses a geographic database 218 having geographic data 220 (e.g., location reference records) and a historic traffic database 222 having historic traffic data 224 stored on a storage medium 226. In this embodiment, the storage medium 226 is installed in the drive 206 so that the geographic database 218 and the historic traffic database 222 can be read and used by the navigation system 202. In one embodiment, the geographic data 220 and the historic traffic data 224 may be a geographic database 218 and historic traffic database 222 published by NAVTEQ North America, LLC of Chicago, Ill. Both the geographic database 218 and historic traffic database 222 or portions of each database can be separately stored. According to one embodiment, a portion of or the historic traffic database 222 may be integrated as part of the geographic database 218. Moreover, the storage medium 226, the geographic database 218, and the historic traffic database 222 do not have to be physically provided at the location of the navigation system 202. In alternative embodiments, the storage medium 226, upon which some or all of the geographic data 220 or the historic traffic data 224 are stored, may be located remotely from the rest of the navigation system 202 and portions of the geographic data provided via a communications link, as needed.

In one exemplary type of system, the navigation application software program 210 is loaded from the non-volatile memory 208 into a RAM 228 associated with the processor 204 in order to operate the navigation system 202. The processor 204 also receives input from the user interface 216. The input may include a request for navigation information. The navigation system 202 uses the geographic database 218 stored on the storage medium 226, possibly in conjunction with the outputs from the positioning system 212 and the receiver 214, to provide various navigation features and functions. The navigation application software programs 210 may include separate applications (or subprograms) that provide these various navigation features and functions. These functions and features may include route calculation 230 (wherein a route to a destination identified by the end-user is determined), route guidance 232 (wherein detailed directions are provided for reaching a desired destination), map display 234, and vehicle positioning 236 (e.g., map matching).

Also included in the navigation programs 210 on the navigation system 202 is a location referencing programming 238. The location referencing programming 238 facilitates using data contained in the traffic messages 112 when performing navigation functions. A method for providing this feature is disclosed in U.S. Pat. No. 6,438,561, entitled "METHOD AND SYSTEM FOR USING REAL-TIME TRAFFIC BROADCASTS WITH NAVIGATION SYSTEMS," the entire disclosure of which is incorporated by reference herein. U.S. Pat. No. 6,438,561 discloses a method and system in which location reference codes used in traffic messages 112 are related to geographic data used by the navigation system 202 thereby enabling it to use the information contained in traffic message broadcasts. Using data from broadcast traffic messages 112 together with the geographic database 218 and historic traffic database 222 allow the navigation system 202 to provide route calculation that considers up-to-the-minute traffic and road conditions when determining a route to a desired destination.

Multiple types of location references are contemplated. In one embodiment, the location reference can be related to the location reference code of the traffic message or the protocols of the traffic channels. Moreover, location references are not limited to geographic locations, such as road segments. According to another embodiment, the location references can also refer to a point of interest on the road segment. Still yet another embodiment, the location references can refer to local data located on a geographic location, such as individual shops or facilities within a shopping mall, a building structure, or a school campus. The invention relating to the local data (e.g., shops or facilities) of a geographic database is detailed in a patent application by Finn et al., entitled "GEOGRAPHIC DATABASE WITH DETAILED LOCAL DATA" filed on Nov. 18, 2005, bearing application Ser. No. 11/283,520, which is herein incorporated, in whole or part, by reference. These and other various location reference programming 238 implementations are readily appreciated by one skilled in the art, they are, thus, within the scope of the various teachings described.

Other functions and programming 240 may be included in the navigation system 202. The navigation application program 210 may be written in a suitable computer programming language such as C, although other programming languages, such as C++ or Java, are also suitable. All of the components described above may be conventional (or other than conventional) and the manufacture and use of these components are known to those of skill in the art. Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

II. Central Facility—Overview

The traffic information broadcast system 110 provides for collecting of data indicating traffic and road conditions, developing traffic messages 112 from the collected data, and transmitting the messages to the vehicles 108 and non-vehicles 118 in the region 102 on a regular and continuing basis. The traffic information broadcast system 110 includes the central facility 200 that develops such traffic messages 112. The central facility 200 includes suitable equipment and programming 200(1), 200(2) for developing the traffic messages 112 as illustrated in FIG. 2. The suitable equipment and programming 200(1), 200(2) for developing the traffic messages 112 is a combination of hardware and software components. In one embodiment shown in FIG. 3, the central facility 200 includes a computing platform 300, such as a personal computer, having a processor 302, RAM 304, user interface 306, communication system 308, and non-volatile storage device 310 for storing a traffic program 312 that develops the traffic messages 112. In one embodiment, the traffic data from traffic suppliers are automatically processed to be broadcast to the navigation system. An operator, however, may need to manually enter and edit traffic information. The user interface 306 can be used, among other things, for entering and editing traffic information. The central facility 200 also includes a geographic database 314 containing geographic data 316 representing the road network 104 of the geographic region 102 associated to the road network. The geographic database 314, in contrast to database 218 which is used for navigation-related application, is used for the providing traffic messages. As such, the geographic database 314 may be similar or different from geographic database 218. The geographic database 314 may also contain portions of the geographic database 218. In one embodiment, the geographic database 314 may contain the geographic data published by NAVTEQ North America, LLC of Chicago, Ill.

The central facility 200 also includes a historic traffic database 318 having historic traffic data 320 of the road network. Portions or the complete geographic database 314 and historic traffic database 318 can be separately stored. According to another embodiment, at least a portion of or the whole historic traffic database 318 may be integrated as part of the geographic database 314. The geographic database 314 work in conjunction with the historic traffic database 318 to provide traffic messages, as needed, for updating traffic conditions on the navigation system 202. In particular, the traffic program 312 includes a traffic reporter 322 that works in junction with a traffic location table 324 to provide the traffic information.

III. Geographic Map Database

A. Geographic Database

Figure 4:
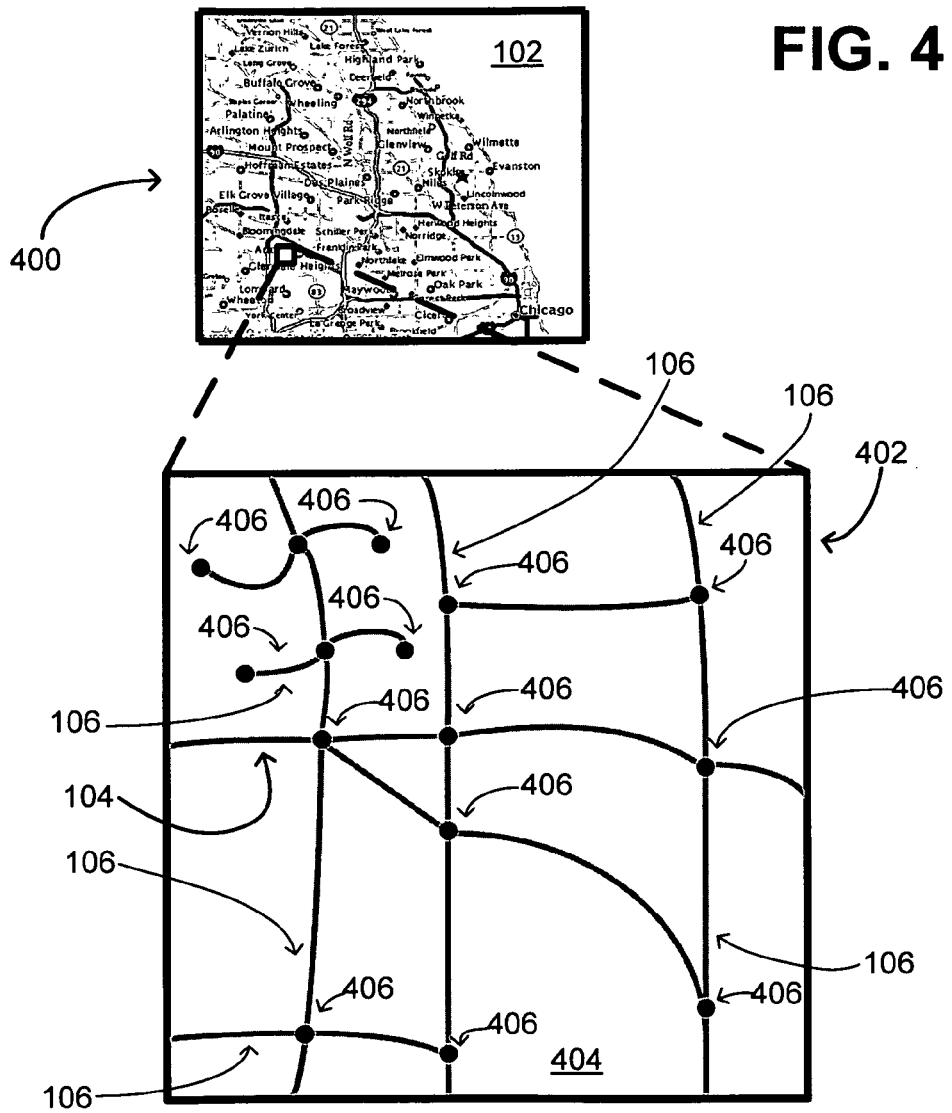
FIG. 4 shows a map of the geographic region shown in FIG. 1.

FIG. 4 illustrates a map 400 of the geographic region 102. The geographic region 102 may correspond to a metropolitan or rural area, a state, a country, or combinations thereof, or any other area. Located in the geographic region 102 are physical geographic features, such as roads, points of interest (including businesses, municipal facilities, etc.), lakes, rivers, railroads, municipalities, etc. It should also be noted that geographic region 102 may not be the same geographic region as shown in FIG. 1. In other embodiments, the geographic region 102 shown in FIG. 1 may contain only portions of the geographic region 102 shown in FIG. 4. The geographic region 102 in FIG. 1 may also be a different region from FIG. 4.

FIG. 4 also includes an enlarged map 402 of a portion 404 of the geographic region 102. The enlarged map 402 illustrates part of the road network 104 in the geographic region 102. The road network 104 includes, among other things, roads and intersections located in the geographic region 102. As shown in the portion 404, each road in the geographic region 102 is composed of one or more road segments 106. The road segment 106 represents a portion of the road. Each road segment 106 is shown to have associated with it two nodes 406; one node represents the point at one end of the road segment and the other node represents the point at the other end of the road segment. The node 406 at either end of a road segment 106 may correspond to a location at which the road meets another road, i.e., an intersection, or where the road dead-ends.

Figure 5:
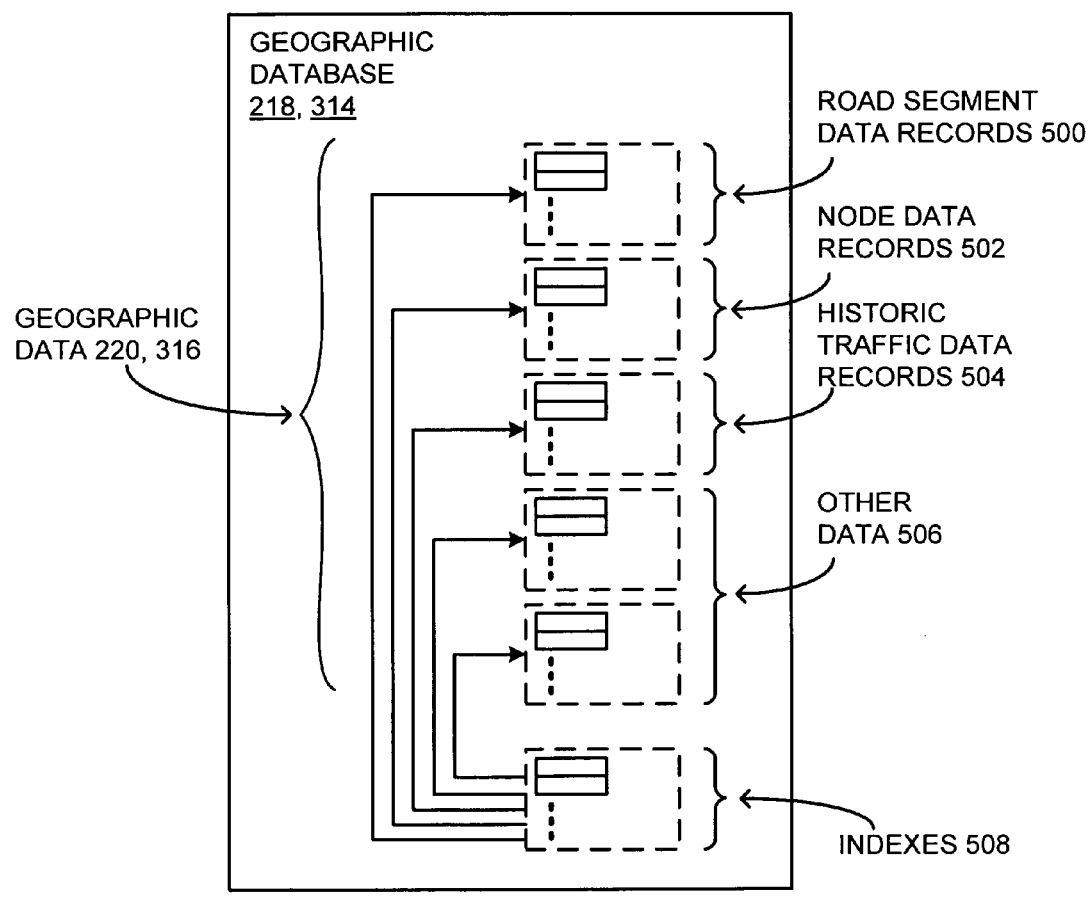
FIG. 5 is a block diagram of a geographic database, according to various embodiments.

Referring to FIG. 5, a block diagram of the geographic database 218, 314 implemented at the navigation system 202 and the central facility 200 is shown. Since the geographic databases 218 and 314 differ in their implementation, they may contain slightly different types of data. Thus, as shown, FIG. 5 shows one of the various embodiments of the geographic databases 218, 214. Moreover, types of information relating to the geographic database 218, 314 relate only a portion of vast types of information that can be included. Since the types of data included can vary greatly depending upon the implementation, various embodiments that are readily appreciated by one skilled in the art are contemplated. Thus, these variations of the records and data, though may be specifically shown, are within the scope of the various embodiments shown.

As shown, the geographic database 218, 314 contains data 220, 316 that represent some of the physical geographic features in the geographic region 102 depicted in FIG. 4. The geographic database 218, 314 includes data 220, 316 that represent the road network 104. In the embodiment of FIG. 5, the geographic database 218, 314 that represents the geographic region 102 contains at least one road segment database record 500 (also referred to as "entity" or "entry") for each road segment 106 in the geographic region 102. The geographic database 218, 314 that represents the geographic region 102 also includes a node database record 502 (or "entity" or "entry") for each node 406 in the geographic region 102. The terms "nodes" and "segments" represent only one terminology for describing these physical geographic features, and other terminology for describing these features is intended to be encompassed within the scope of these concepts.

The geographic database 218, 314 also includes historic traffic data records 504, which represent the various historic traffic information located in the geographic region 102. For example, the historic traffic data records 504 may include data representing historic traffic data as audio outputs, video outputs, icon outputs, and text outputs on a navigation system. The geographic database 218, 314 may also include other kinds of data 506, which may represent other kinds of geographic features or anything else. The geographic database 218, 314 also includes indexes 508. The indexes 508 may include various types of indexes that relate to different types of data to each other or that relate to other aspects of the data contained in the geographic database 218, 314. For example, the indexes 508 may relate the nodes in the node data records 502 with the end points of a road segment in the road segment data records 500.

B. Road Segment Data Record

Figure 6:
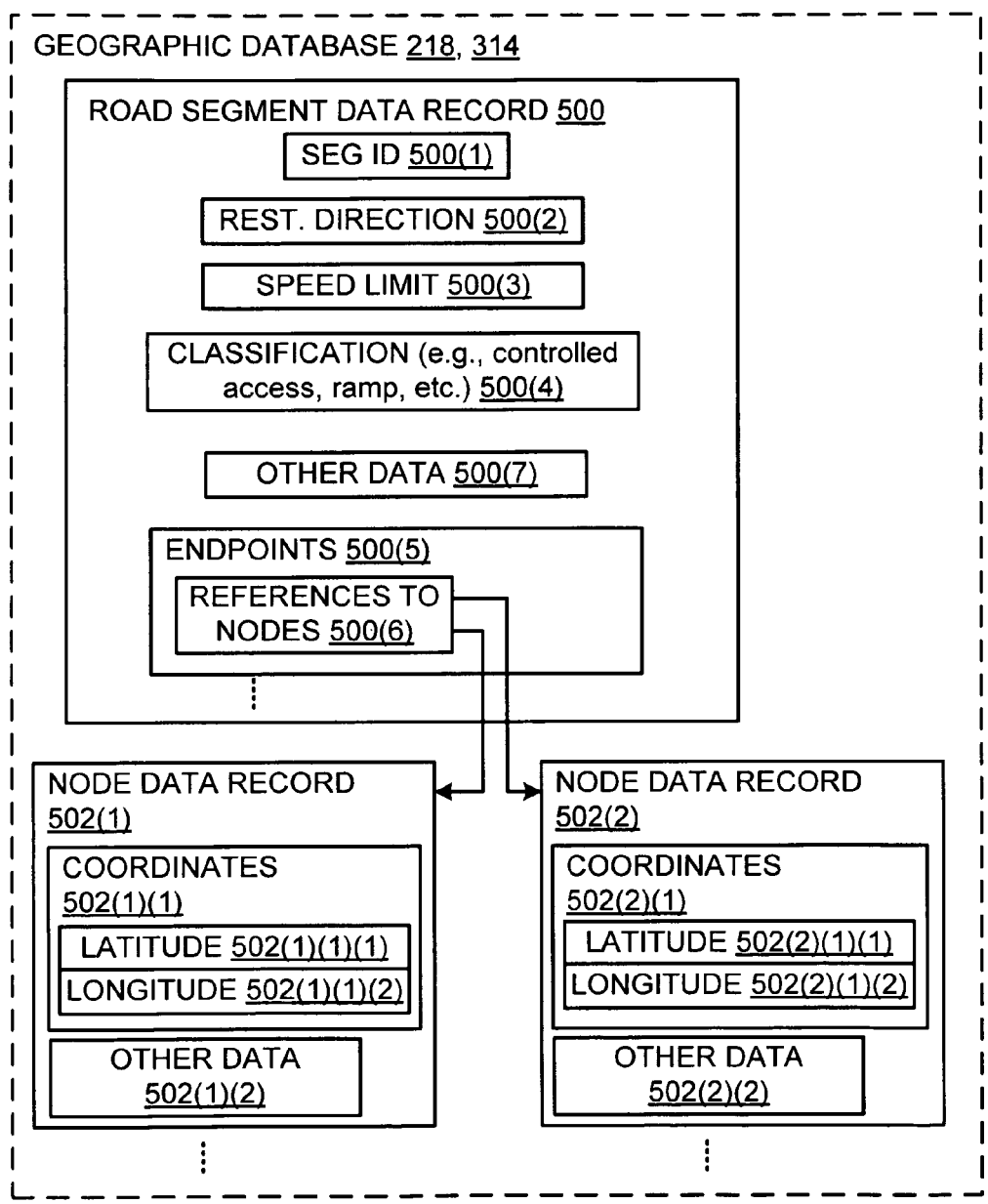
FIG. 6 is a block diagram of the road segment data records contained in the geographic database depicted in FIG. 5, according to various embodiments.

FIG. 6 shows some of the components of a road segment data record 500 contained in the geographic database 218, 314. The road segment data record 500 includes a segment identification ("ID") 500(1) by which the data record can be identified in the geographic database 218, 314. Each road segment data record 500 has associated with it information (such as "attributes", "fields", etc.) that describes features of the represented road segment. The road segment data record 500 may include data 500(2) that indicate the restrictions, if any, on the direction of vehicular travel permitted on the represented road segment. The road segment data record 500 includes data 500(3) that indicate a speed limit or speed category (i.e., the maximum permitted vehicular speed of travel) on the represented road segment. The road segment data record 500 may also include data 500(4) indicating whether the represented road segment is part of a controlled access road (such as an expressway), a ramp to a controlled access road, a bridge, a tunnel, a toll road, a ferry, and so on.

The road segment data record 500 also includes data 500(5) providing the geographic coordinates (e.g., the latitude and longitude) of the end points of the represented road segment. In one embodiment, the data 500(5) are references 500(6) to the node data records 502(1), 502(2) that represent the nodes corresponding to the end points of the represented road segment. The road segment data record 204 may also include or be associated with other data 500(7) that refer to various other attributes of the represented road segment. The various attributes associated with a road segment may be included in a single road segment record, or may be included in more than one type of record which cross-references to each other. For example, the road segment data record 500 may include data identifying what turn restrictions exist at each of the nodes which correspond to intersections at the ends of the road portion represented by the road segment, the name or names by which the represented road segment is known, the street address ranges along the represented road segment, and so on.

FIG. 6 also shows some of the components of a node data record 502(1), 502(2) contained in the geographic database 218, 314. Each of the node data records 502(1), 502(2) may have associated information (such as "attributes", "fields", etc.) that allows identification of the road segment(s) that connect to it and/or it's geographic position (e.g., its latitude and longitude coordinates). For the embodiment shown in FIG. 6, the node data records 502(1) and 502(2) include coordinates 502(1)(1) and 502(2)(1) for their node, such as latitude 502(1)(1)(1), 502(2)(1)(1) and longitude 502(1)(1)(2), 502(2)(1)(2). The node data records 502(1) and 502(2) may also include other data 502(1)(2) and 502(2)(2) that refer to various other attributes of the nodes.

C. Historic Traffic Data Record

Figure 7:
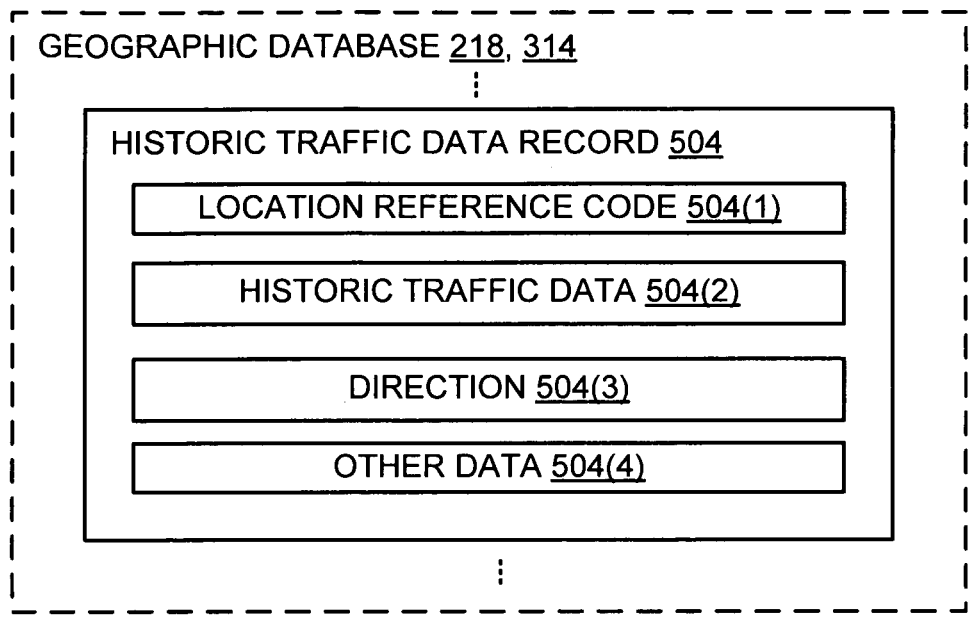
FIG. 7 is a block diagram of the historic traffic data records contained in the geographic database depicted in FIG. 5, according to various embodiments.

FIG. 7 shows some components of a historic traffic data record 504 contained in geographic database 218, 314. The historic traffic data record 504 represents the historic traffic conditions located in the geographic region 102. According to one embodiment, the historic traffic conditions are organized according to specific location of the geographic region to provide traffic conditions customized to the real-time experience and location of the user. With this embodiment shown, the historic traffic data record 504 is integrated as part of the geographic database 218, 314. The historic data record 504 is also associated with a location reference code 504(1) and a direction 504(2) of the road segment associated with the location reference code. Historic traffic data 504(3) and other data 504(4) relating the associated location reference code 504(1) are then represented in the historic traffic data record 504.

Figure 8:
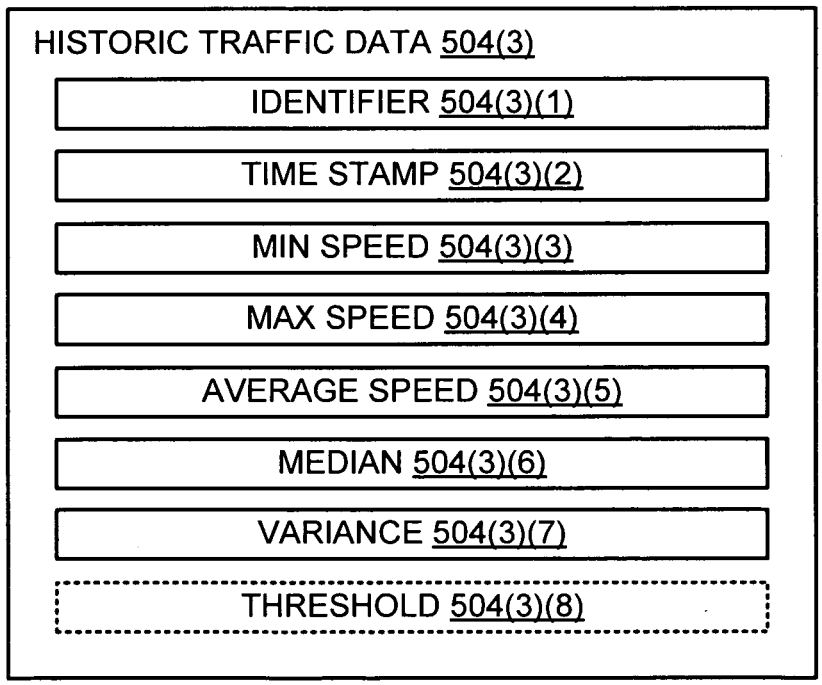
FIG. 8 is a block diagram of the historic traffic data depicted in FIG. 7, according to various embodiments.

Turning now to FIG. 8, a block diagram of the historic traffic data 504(3) depicted in FIG. 7 is shown. In this embodiment shown, the historic traffic data 504(3) include an identifier 504(3)(1) for identifying the historic traffic data record 504. Since traffic conditions depend upon the time of day, a time stamp 504(3)(2) is included. Several embodiments are contemplated with the time stamp 504(3)(2), one embodiment is to include all the various time stamps defined by a predetermined factor of the location reference code in the historic traffic record 504. For example, the historic traffic record 504 that is associated with the location reference number may include a traffic condition every 5 minutes. Aside from the time stamp, other information, such as minimum speed 504(3)(3), maximum speed 504(3)(4), and/or average speed 504(3)(5), can also be included. Depending upon the implementation, some statistical information may also be helpful. For example, a median 504(3)(6) or a variance 504(3)(7) may be included in the historic traffic data record 504 to assist in the determination when the current traffic conditions from the traffic suppliers had sufficiently deviated from the historic traffic pattern.

Furthermore, a predefined threshold 504(3)(8) may also be included as a tolerance factor for the deviation between the current traffic conditions and the historic traffic conditions. In an alternative embodiment, the threshold 504(3)(8) may also be dynamically generated by an algorithm in the central facility 200 or the navigation system 202. In this case, a threshold 504(3)(2) may be excluded from the historic traffic data record 504. In the various embodiments, the threshold 504(3)(8) may be a predefined constant value, a minimum value, a maximum value, an average value, a median value, a variance, and an auto covariance. These and other embodiments are again contemplated and readily appreciated by a skilled artisan, and thus, they are within the scope of the various embodiments shown.

IV. Traffic Messages

A. Traffic Message Components

Figure 9:
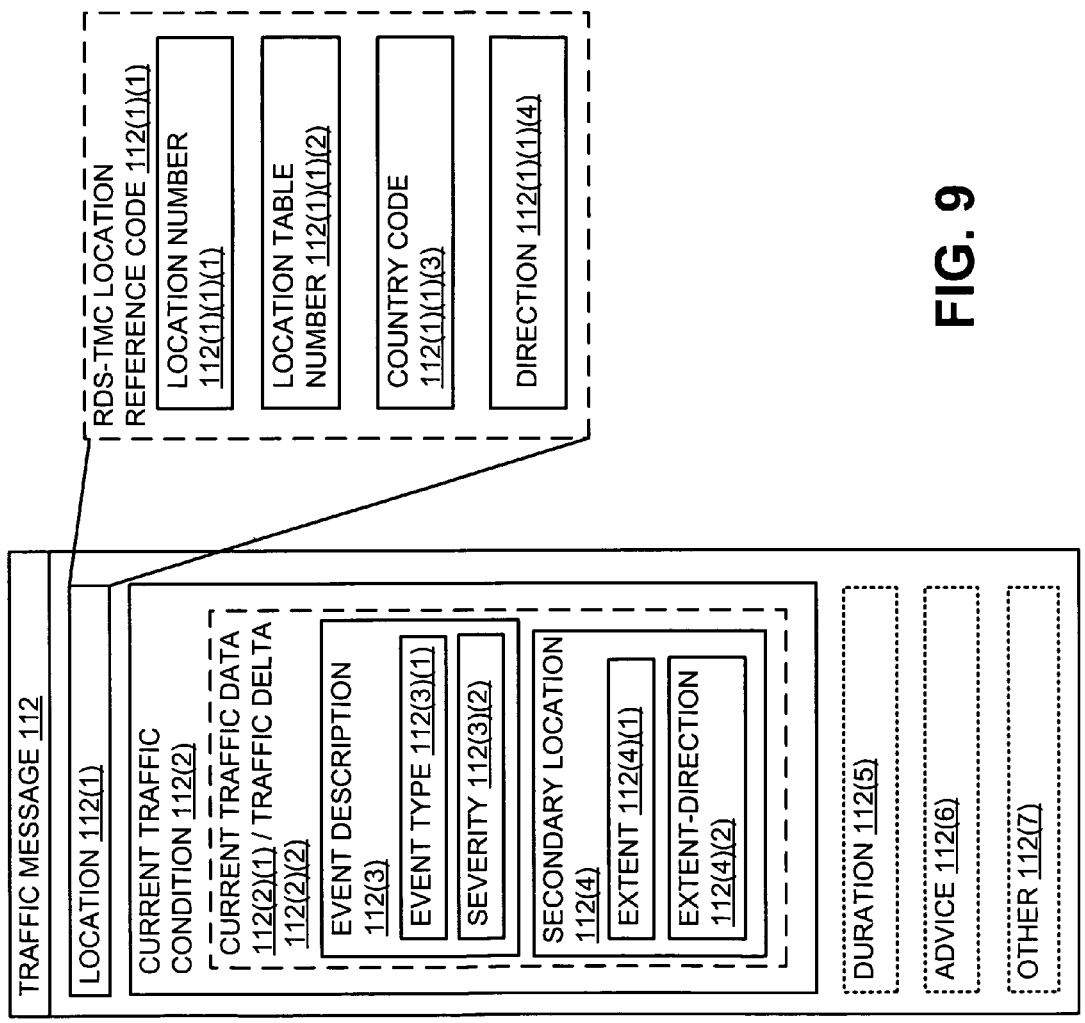
FIG. 9 is a block diagram of the traffic message, according to various embodiments.

Turning to now to FIG. 9, a block diagram of the traffic message 112 is shown. Since the central facility 200 may provide the traffic messages 112 in a variety of different formats for transmission by different broadcasters and for use with different end users, many different variations and embodiments of the different data components may be included with the traffic message. Thus, FIG. 9 illustrates but one of the many examples of the data components in a traffic message. For brevity, the following data formats shown comply with the ALERT-C protocol, although other data formats are contemplated and within the scope of the various teachings.

As the first component of the traffic message 112 shown, a location portion 112(1) of the traffic message 112 is included to specify the location at which a traffic queue begins. This location may be referred to as the primary location or the head. A current traffic condition component 112(2) is further provided. In FIG. 9, two specific examples of the traffic condition component 112(2) are shown, specifically current traffic data 112(2)(1) having the current traffic condition or a traffic delta 112(2)(2) between the historic traffic database and the current traffic data. It should be noted that these two alternative embodiments are shown as an example, other implementations of the current traffic condition component 112(2), which are readily appreciated by one skilled in the art, are contemplated and are within the scope of the various embodiments shown. The current traffic condition component 112(2) provides current traffic conditions using the traffic channel.

Specifically, since traffic messages 112 having the current traffic conditions are sent when there is a deviation from the historic traffic data within a predefined threshold, the traffic messages may include only the traffic delta 112(2)(2). The traffic delta 112(2)(2) along with the historic traffic database 222 on the navigation system 202 provides sufficient information to determine the actual current conditions. This embodiment, however, requires processing on the end of the navigation system 202, because the historic traffic data 224 must be obtained to be added to the traffic delta 112(2)(2). The traffic delta 112(2)(2), though, may require less memory than the current traffic data 112(2)(1), and thus, it may reduce the bandwidth needed to transmit the traffic message. But the traffic delta 112(2)(2) may be more difficult to implement on the existing navigation system, depending upon the system. For example, connected service implementations (e.g., cell phone) may more easily be updated than on-broad vehicle navigation system. In the alternative, the current traffic data 112(2)(1), while possibly requiring more bandwidth, may be more beneficial for addressing the implementation of an existing system. Moreover, the use of current traffic data 112(2)(1) may require less processing on the end of the navigation system since the historic traffic database is not required to be processed, because the current traffic data 112(2)(1) contain all the information needed to provide the current traffic conditions to the user. As such, depending upon the configurations of the implementation, one of these two alternative embodiments may be better suited.

Within either embodiments of the current traffic condition 112(2), an event description component 112(3) may be further included along with data that describe a traffic event type 112(3)(1) of the primary location, such as a traffic condition along with data that describe a level of severity 112(3)(2) of the event type. The traffic message 112 may also indicate a secondary location or tail. The traffic message 112 indicates this secondary location 112(4) indirectly, i.e., by means of an extent component 112(4)(1) and an extent-direction component 112(4)(2). The extent component 112(4)(1) indicates how many location codes from the primary location are affected at the level of severity (i.e., 112(3)(2)) indicated in the traffic message 112. The extent-direction component 112(4)(2) includes data that indicate the direction of traffic affected.

According to one embodiment, the traffic message 112 conforms to the standard format for ALERT-C messages established in the RDS-TMC system. For example, in the RDS TMC system, the event description 112(3), including description 112(3)(1) and severity 112(3)(2), is an ALERT-C event code, and a duration 112(5) is an ALERT-C duration code. In the RDS TMC system, the location 112(1) portion of the message 112 includes a RDS TMC location reference code 112(1)(1). The RDS TMC location reference code 112(1)(1) includes a location number 112(1)(1)(1), a location table number 112(1)(1) (2), a country code 112(1)(1)(3), and a direction 112(1)(1)(4). The location number 112(1)(1)(1) is a unique number within a region to which one location table (i.e., a database of numbers) corresponds to. The location table number 112(1)(1)(2) is a unique number assigned to each separate location table. The country code 112(1)(1)(3) is a number that identifies the country in which the location referenced by the location number 112(1)(1)(1) is located. The direction 112(1)(1)(4) takes into account bi-directionality. The duration component 112(5), on the other hand, provides an expected amount of time that the traffic condition will likely exist. However, in this embodiment shown, the duration 112(5) will be left blank since the current traffic condition 112(2) provides the needed information.

It should be noted, however, that since other data formats are contemplated depending on the traffic system, the term "location reference code" includes other message protocols other than the ALERT-C protocol. Thus, these terms include other message protocol for performing similar functions relating to the location reference code.

Along with the current traffic condition 112(2), a further advice component 112(6) can be included to provide a recommendation for a diversion of route. An additional other component 112(7) may also be included to provide any other information relating to the traffic message 112. As shown, the central facility 200 may format the traffic data into traffic messages 112 that correspond to the ALERT-C messages established in the RDS-TMC system. Additionally, different traffic message formats are possible. These formats include, but are not limited to, Alert-C protocol, Alert-Plus protocol, packet-based protocol, and VICS message protocol. Since the appropriate message format depends greatly upon the communication system, any format that can be implemented to any type of communication system is contemplated. Specifically, some of the current available communications contemplated include, but again are not limited to, Radio Data System (RDS), Traffic Message Channel (TMC), Radio Data System-Traffic Message Channel (RDS-TMC), Vehicle Information and Communication System (VICS), digital radio, satellite radio, mobile Internet, mobile paging, and General Packet Radio Services/Global System for Mobile (GPRS/GSM) phone networks.

B. Assignment of the Location Reference Number

Figure 10:
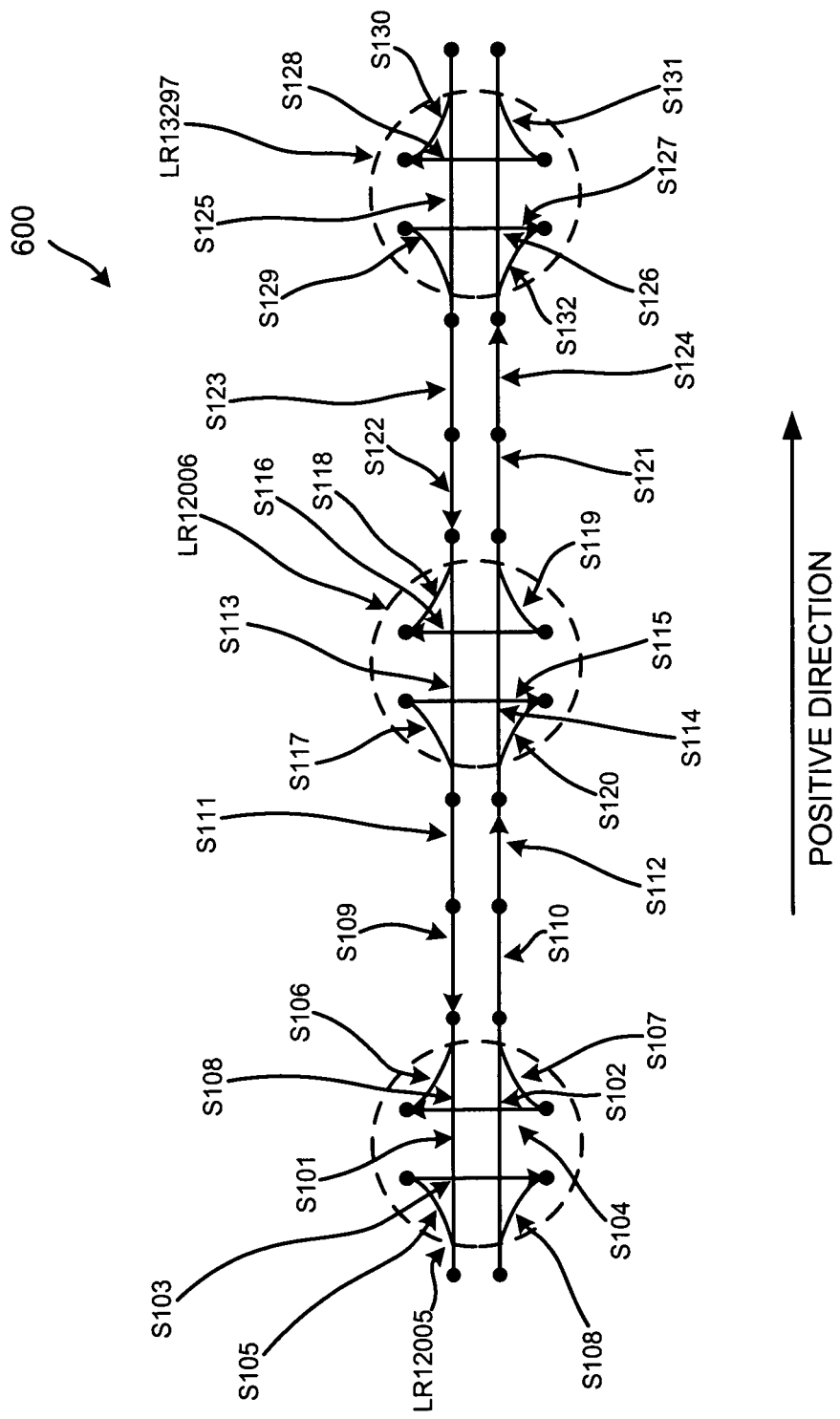
FIG. 10 is an illustration of a portion of a roadway along which intersections have been assigned location reference numbers which are used by the traffic broadcast system of FIG. 1.

FIG. 10 shows one example of how location reference numbers are assigned. Specifically, FIG. 10 illustrates a portion of a roadway 600, which represents multiple road segments 106 in the road network 104 (FIG. 1) that the traffic information broadcast system 110 monitors and reports traffic congestion by means of traffic messages 112.

In order to identify locations along the roadway 600 at which traffic congestion occurs, location reference numbers (e.g., LR12005, LR12006, and LR13297) are pre-assigned to locations along the roadway. These location reference numbers are assigned by the road authorities or others involved with the traffic information broadcast system 110. The traffic messages 112 broadcast by the traffic information broadcast system 110 include these location reference numbers when identifying locations of traffic congestion.

In traffic information broadcast systems, such as the RDS-TMC system, the roadway 600 being monitored and about which traffic messages are broadcast is usually an expressway or major arterial road. Traffic conditions along minor roads may not be monitored by these kinds of traffic broadcast systems. Accordingly, in traffic information broadcast systems, such as the RDS-TMC system, location reference numbers are assigned to locations along expressways and major arterial roads, but not along minor roads.

FIG. 10 shows only three location numbers, LR12005, LR12006, and LR13297. It is understood that in a typical traffic information broadcast system, there may be hundreds, thousands, or more, of location reference numbers assigned to locations along roads in each region represented by a location table. As shown in FIG. 10, the location reference numbers correspond to interchanges along the roadway 600. However, location reference numbers may be assigned to any position along the roadway 600, including positions between interchanges.

In traffic broadcast systems, such the RDS-TMC system, directions may be defined as positive or negative. For example, in the RDS-TMC system, the direction is positive for travel directions west to east and from south to north. The location reference numbers may be, but are not necessarily, assigned in consecutive order along a road segment.

In traffic information broadcast systems, such as the RDS-TMC system, each roadway 600 is assigned its own location reference numbers. The location reference numbers of one roadway 600 are not shared with other roadways. Therefore, at an interchange between two roadways each of which is assigned a location reference number, one location reference number is assigned to the interchange for the first of the roadways 600 and a second different location reference number is assigned to the same interchange for the second of the roadways. Thus, a single interchange may have two or more location reference numbers assigned to it, one for each of the roadways that meet at the interchange.

As mentioned above, one of the difficulties associated with using the location reference numbers with a navigation system that uses a geographic database is that the location reference numbers do not necessarily relate to any physical roadway features. As illustrated in FIG. 10, the roadway 600 is shown to consist of individual road segments, labeled S101, S102, . . . S132. These road segments S101, S102, . . . S132, correspond to individual portions (i.e., segments) of the roadway 600. For example, each of these individual segments of the roadway 600 may comprise a portion of the roadway between intersections of the roadway with other roads, including on-ramps and off-ramps. In the geographic database 218, 314 (FIG. 5), each of these separate road segments, S101, S102, . . . S132, is represented by at least one separate data record.

In the road segment shown in FIG. 10, there are separate road segments associated with the lanes of the roadway 600 for each direction. This represents a typical expressway configuration in which the lanes going in one direction are physically separate from the lanes going in the other direction. Where the lanes are actually physically separate from each other, such as in the portion of the roadway 600 depicted in FIG. 10, there may be separate segment data records in the geographic database 218, 314 for the lanes in one direction and the lanes in the other direction. Even where the lanes of the roadway 600 are not physically separated from each other, they may be represented by separate data records in the geographic database. Alternatively, a single segment data record may be included in the database that represents all the lanes of the roadway 600 in both directions. The database records include attributes that indicate whether they represent lanes in both directions or only lanes in a single direction.

As illustrated in FIG. 10, there may be multiple segments, S101, S102, . . . S132, of the roadway 600 associated with each location along the roadway to which a location reference number (e.g., LR12005, LR12006 . . . ) has been assigned. As stated above, each of these multiple segments of the roadway 600 may be represented by at least one record in the geographic database 218, 314. Moreover, as illustrated by FIG. 10, there may also be several segments of the roadway 600 located between the interchanges along the roadway 600 to which location reference numbers have been assigned. Each of these segments of the roadway 600 between interchanges may be represented by at least one record in the geographic database 218, 314. However, none of these individual road segments S101, S102 . . . , S132, is separately identified as relating to the location reference numbers by the traffic broadcast system in the messages that are broadcast.

As mentioned above, it would be advantageous if the data in the traffic messages 112 could be utilized when calculating a route using the route calculation function 230 in the navigation system 202 (FIG. 2). If the data in the traffic messages could be used by the navigation system, the segments associated with traffic congested locations that are assigned location reference numbers could be avoided by the route calculation function. Unfortunately, as exemplified by FIG. 10, the location numbers assigned by the traffic broadcast system authorities do not directly relate to any physical feature represented by the data records in the geographic database 218, 314. Moreover, the traffic messages broadcast by the traffic information broadcast system 110 do not necessarily relate to any of the actual road segments that are represented by data records in the geographic database.

Still another factor that complicates using the traffic messages broadcast by a traffic broadcast system in a route calculation function in a navigation system is that, in systems such as the RDS-TMC system, the length of the roadway affected by an occurrence of traffic congestion is reported in terms of the "extent" data 112(3)(1) which is included in the broadcast traffic message, as mentioned above in connection with FIG. 9. The "extent" data are defined in terms of the number of adjacent positions represented by location numbers that are affected by the traffic congestion condition relative to the position along the roadway identified by the location reference number in the traffic message. Thus, the "extent" data 112(3)(1) also do not bear any direct relationship with physical features represented by data records in the geographic database. Using "extent" data in traffic messages compounds the difficulty of incorporating traffic information broadcast message information in the route calculation function 230 of the navigation system 202.

In order to use the traffic message data to support a route calculation function, a way is required that relates the location reference data from a traffic message to the geographic data (such as the segment data records) in the geographic database used by the route calculation function. In a route calculation function, such as the function 230 shown in FIG. 2, route calculation may be performed by exploring multiple potential solution routes from a starting location to a destination location. The route calculation function 230 may perform this process by comparing multiple possible paths from intersections along parts of potential solution routes and selecting the path that has the best overall cost, based upon some cost assignment criteria. To compare these potential solution routes, or parts thereof, the data records that represent each road segment in these potential solution routes are examined. These data records include information from which a comparison of the potential solution routes can be made. For example, the data records that represent road segments may include attributes that indicate the speed limit along the represented road segment, whether there is a stop light at the end of the road segment, and so on. Using these data, the potential solution routes can compared to each other so that the best solution route (e.g., the route with the fastest overall travel time or the least overall distance) can be selected.

It can be appreciated that the data in the traffic messages 112 broadcast by the traffic broadcast system, such as the data that identify areas of traffic congestion, may be pertinent to the calculation of the best overall route. In order to incorporate the information in the traffic data messages into the route calculation function, it is required to identify the data records that represent the road segments that are associated with the interchanges, including those road segments that lead into the interchanges, for which location reference numbers have been assigned by the traffic information broadcast system 110. To provide this function, present embodiments include combinations of features and/or components that allow a navigation application program 210 in the navigation system 202 to use the data in the traffic messages 112. A more detailed description of the location keys of the traffic message is disclosed in U.S. Pat. No. 6,438,561 issued to Israni et al., owned by NAVTEQ North America, LLC, which is incorporated, in whole and/or in part, by reference.

V. Traffic Message Applications

Figure 3:
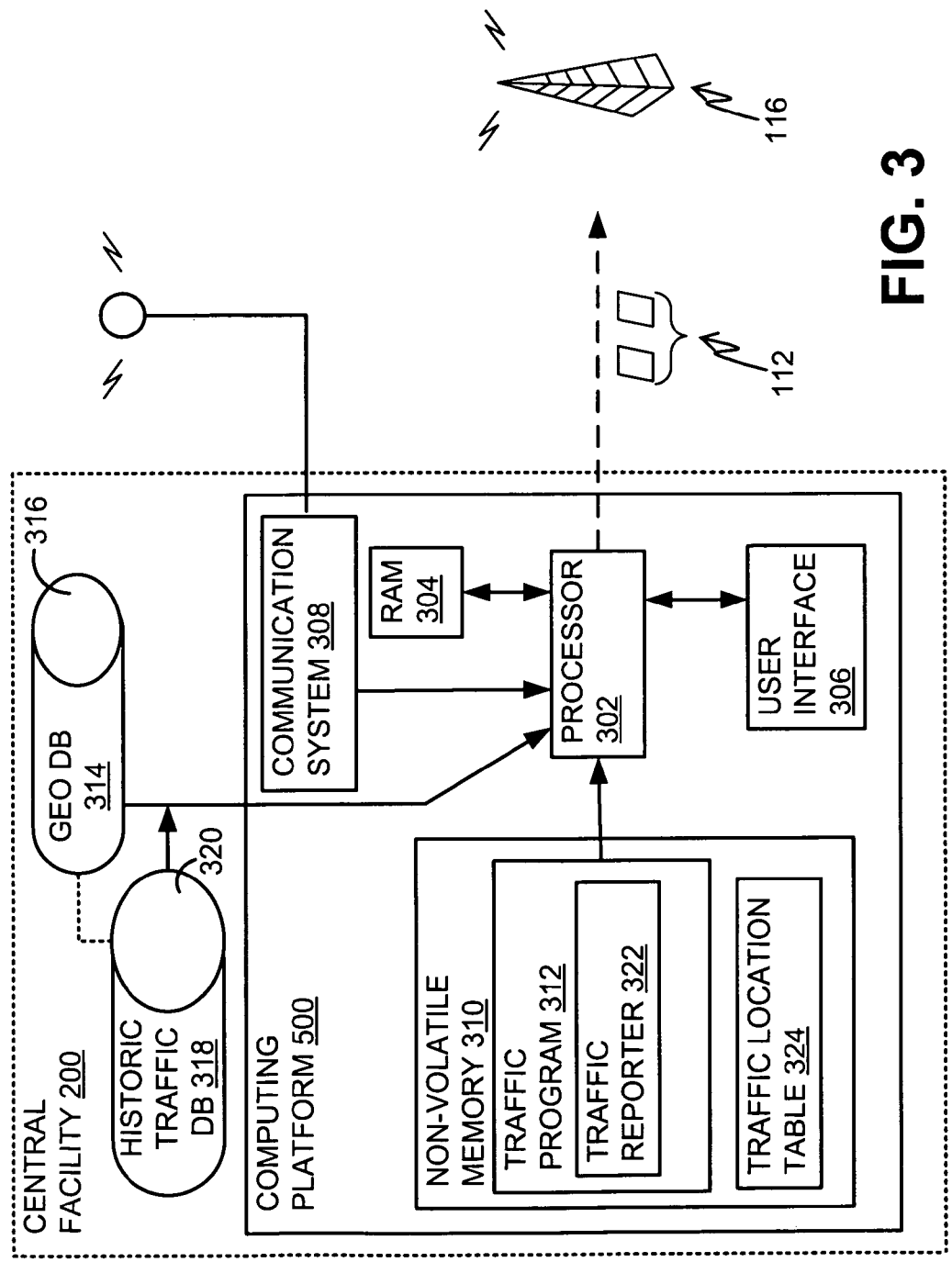
FIG. 3 is a block diagram illustrating the components of a central facility of the traffic broadcast system as shown in FIGS. 1 and 2.

The processes shown are specific implantations of the components shown in the operating paradigm shown in FIGS. 1 through 3. Other implementations of each of the processes shown, however, may be better suited for other components of the system, specifically such as the central facility 200 and the navigation system 202. Since the appropriate processes greatly depend upon the configuration and the resources of the system, other implementations that may not be specifically described are readily appreciated by one skilled in the art. Moreover, these processes shown can further be implemented fully or partially at any of the components within the system shown in FIGS. 1 through 3. As one skilled in the art can readily appreciate, any of the processes shown can be altered in multiple ways to achieve the same functions and results of the various teachings described. As a result, these processes shown are one exemplary embodiment of multiple various embodiments that may not be specifically shown. Thus, the processes shown are directed to the system, and each of them may be altered to accommodate any of the components in the navigation network. These other embodiments, however, are within the scope of the various teachings described.

Figure 11:
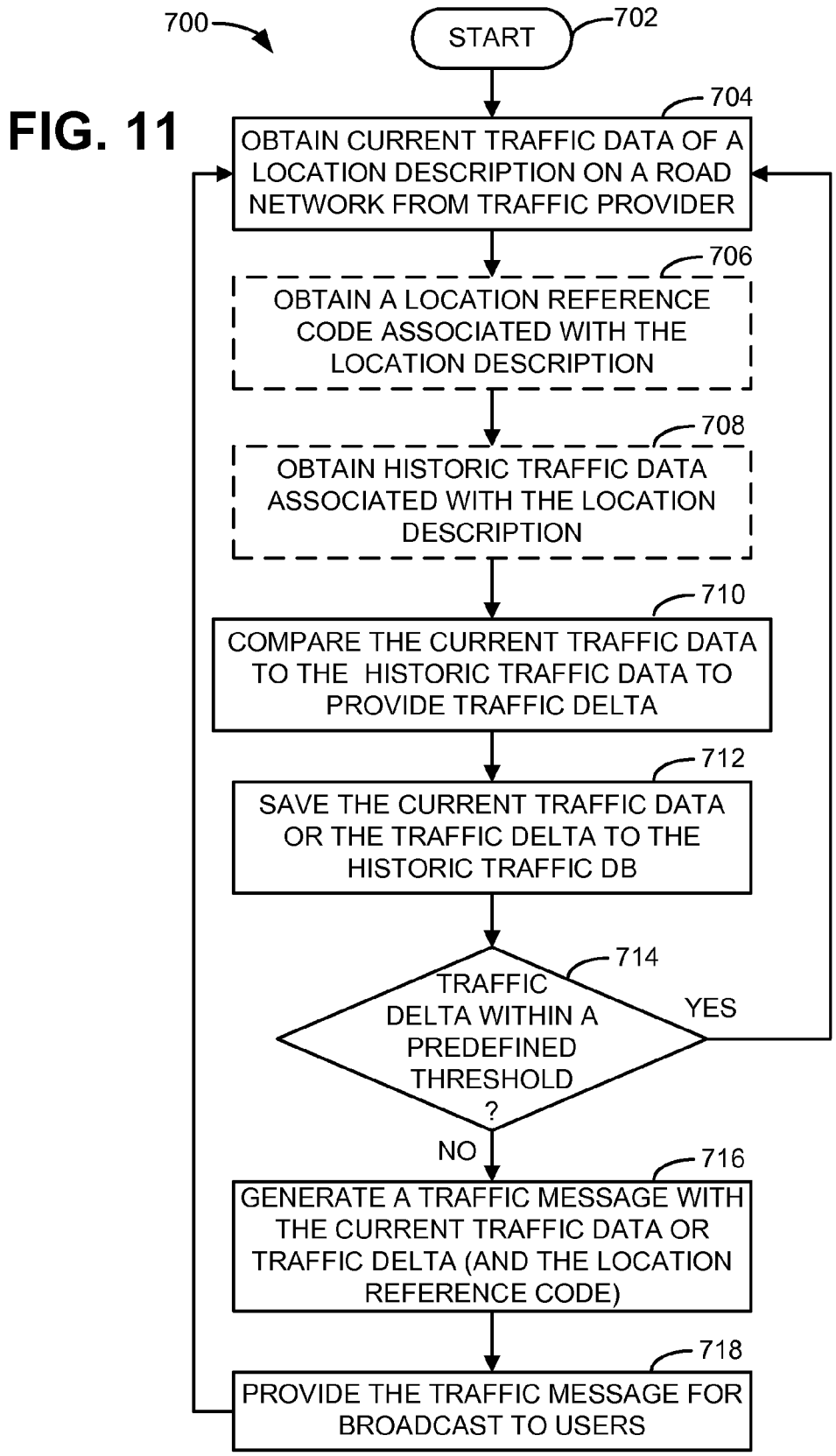
FIG. 11 is a flow chart diagram of a process for generating the traffic messages, according to various embodiments.

Turning now to FIG. 11, a flow diagram of a process for generating the traffic messages implemented at the central facility 200 (i.e., server-side) is shown according to various embodiments and indicated generally at 700. The process 700 starts 702 by obtaining 704, from a traffic provider, current traffic data having a traffic condition of a location description on a road network. Once the current traffic data are obtained 704, a location reference code associated with the location description is obtained 706. Historic traffic data associated with the location description are also obtained 708 at this time. Once the current traffic data and the historic traffic data are obtained, they are compared 710 to provide a traffic delta. To maintain the historic traffic database, the current traffic data and/or the traffic delta are/is saved 712 to the historic traffic database, which may not be the same version for the comparison for the delta. In order to maintain synchronization with the historic traffic database with the navigation system, the current traffic data may be saved to another version of the historic traffic database.

A determination 714 is made as to whether the traffic delta is within a predefined threshold. If the traffic delta is within the predefined threshold, a traffic message is generated 716 with either the current traffic data or the traffic delta, depending upon the choice of implementation. This traffic message is then provided 718 for broadcast to users of the navigation system. If the implementation is on the Alert-C system, the location reference code will also be included into the traffic message. The implementation of determining 714 whether the traffic delta corresponds with the predefined threshold depends upon the configuration of the implementation and the predefined threshold. Multiple embodiments of this determination 714 are contemplated. For example, the correspondence between the traffic delta and the predefined threshold may include a difference between the traffic delta and the threshold, the traffic delta being greater than the threshold, the traffic delta being at least equal to the threshold, the traffic delta being less than the threshold, and the traffic delta being within a range of values.

If, on the other hand, the traffic delta is not within the predefined threshold, the process 700 loops back to obtain current traffic data from the traffic supplier. Since depending upon the characteristics of the location description and speed of the vehicles, multiple embodiments of the threshold are contemplated. For example, a current traffic condition that differs from the historic traffic condition by 10 miles per hour would be insufficient when the vehicles are traveling over 60 miles per hour. In contrast, a 10 mile-per-hour delay may mean that there is a traffic delay on that road segment in a residential zone having a 25 miles-per-hour speed limit.

As a result, it is difficult to determine a single threshold for the road segment. Multiple embodiments are contemplated. The threshold can be tailored to the speed of vehicle or the speed limit of the road segment. In one embodiment, the threshold may be a range of values. Some of the threshold implementations for triggering the traffic message being sent include, but are not limited to, a difference between the traffic delta and the threshold, the traffic delta being greater than the threshold, the traffic delta being at least equal to the threshold, the traffic delta being less than the threshold, and the traffic delta being within a range of the threshold. Since the number of different implementations is vast and are readily appreciated by one skilled in the art, other threshold implementations, although may not be specifically shown, are within the scope of the various teachings described.

Figure 12:
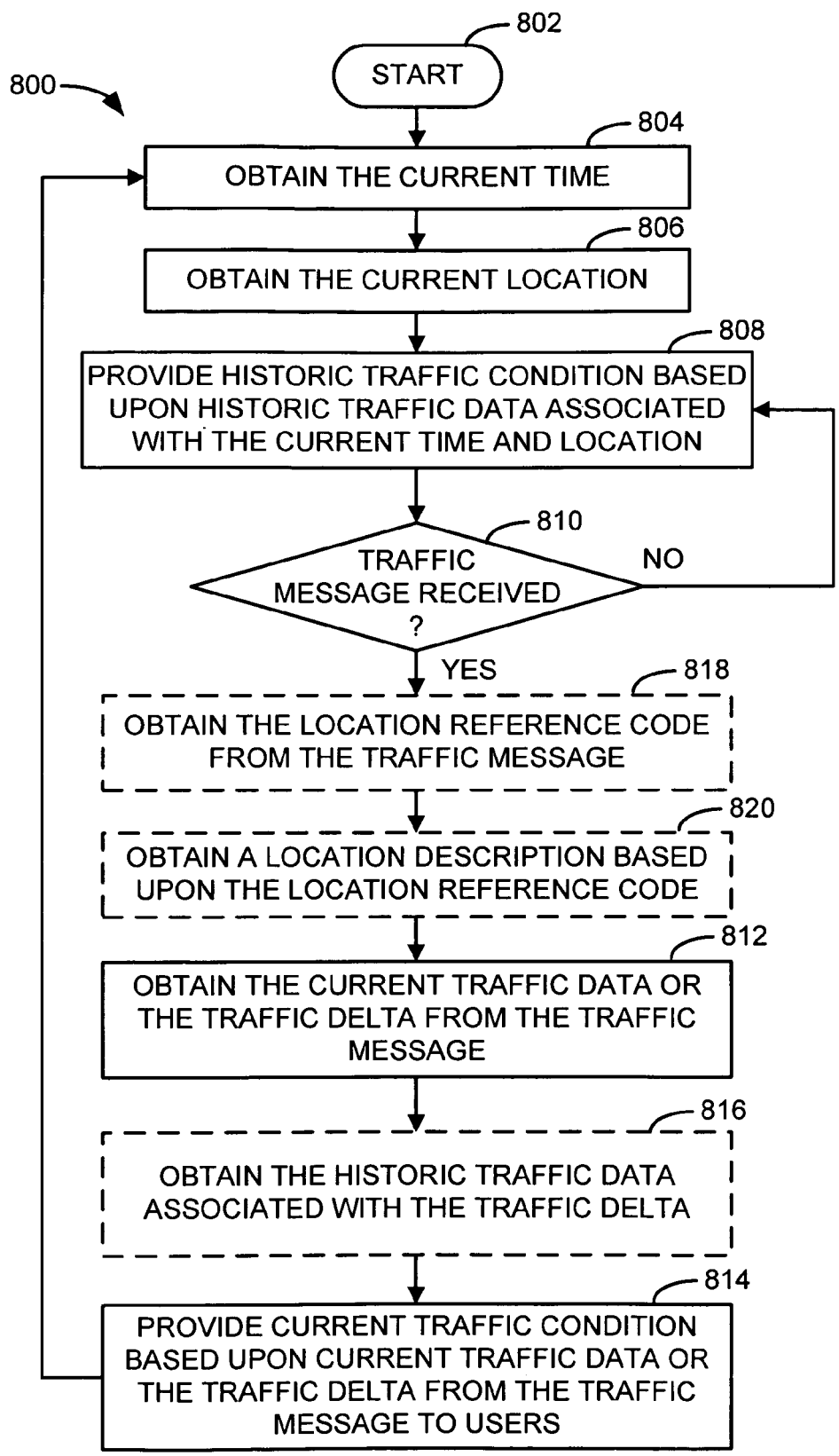
FIG. 12 is a flow chart diagram of a process for providing the traffic conditions, according to various embodiments.

Referring now to FIG. 12, a flow diagram of a process, implemented at the navigation system 202 (i.e., client-side), for providing the traffic conditions is shown and indicated generally at 800. According to one embodiment, the process 800 starts 802 by obtaining 804, 806 the current time and location of the navigation system. The historic traffic condition is provided 808 to the user on the navigation system using historic traffic data that are associated to the current time and location of the navigation system. A determination 810 is made as to whether a traffic message has been received from the server side, such as the central facility. If no such traffic message has been received, the process 800 loops back to continue providing 808 the historic traffic condition using the historic traffic data. If, however, a traffic message is received from the central facility, the current traffic data or the traffic delta is obtained 812 from the traffic message in order to provide 814 the current traffic condition to the user of the navigation system.

In the specific embodiment of the traffic message with the traffic delta, the historic traffic data associated with the traffic delta is obtained 816 and used for providing 814 the current traffic condition. In this case, the historic traffic data and the traffic delta will be combined to provide the current traffic condition. For the specific embodiment of the Alert-C protocol, the location reference code is obtained 818 from the traffic message. A location description based upon this location reference code is then obtained 820 to provide the current traffic condition based upon the location description and the current location of the navigation system. After the current traffic condition has been provided to the user, the process 800 loops back to obtain 804 the current time to run another iteration of the process.

Through the embodiments of various teachings, an improved technique for providing traffic information is provided. With the use of the historic traffic data along with the traffic delta, unnecessary traffic messages are reduced. As a result, bandwidth and resources needed to provide the traffic information are conserved. Overall, traffic information is provided more efficiently and seamlessly.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

I claim:

1. A method of providing traffic information on a navigation system comprising:
    obtaining a current location of the navigation system from a global positioning system (GPS);
    determining, by a processor, whether a traffic message has been received at the navigation system, wherein the traffic message includes a traffic delta between current traffic data and historic traffic data for the current location;
    providing, by the processor, a current traffic condition when the traffic message has been received by combining the traffic delta in the traffic message with historic traffic data having a time stamp corresponding to a current time, wherein the historic traffic data is obtained from a historic traffic database on the navigation system, and wherein the traffic delta is received when the traffic delta exceeds a threshold, and the threshold is variable and dependent on a speed of the current traffic or a speed limit at a current location of the navigation system; and
    providing the historic traffic data from the historic traffic database on the navigation system when the traffic message has not been received.

2. The method according to claim 1 further comprising:
    obtaining a current time,
    wherein the current traffic data and the historic traffic data are based, at least in part, on the current time and the current location of the navigation system.

3. The method according to claim 1, further comprising:
    prior to providing the current traffic condition, obtaining a location reference code from the traffic message, wherein the current traffic condition is based, at least in part, upon the location reference code.

4. The method according to claim 3, wherein the location reference code comprises any one or more selected from a group of a geographic location, a point of interest, and a local location of a geographic location.

5. The method according to claim 1, wherein the traffic message is broadcast using any one or more selected from a group of Radio Data System (RDS), Traffic Message Channel (TMC), Radio Data System-Traffic Message Channel (RDS-TMC), Vehicle Information and Communication System, digital radio, satellite radio, mobile Internet, mobile paging, and General Packet Radio Service/Global System for Mobile (GPRS/GSM) phone networks.

6. The method according to claim 1, wherein the traffic message uses any one or more selected from a group of an Alert-C protocol, Alert-Plus protocol, packet-based protocol, and Vehicle Information and Communication System message protocol.

7. An apparatus for providing traffic information comprising:
- a receiver for receiving a traffic message having a traffic delta between current traffic data and historic traffic data, wherein the traffic delta is selected when a difference between the current traffic data and the historic traffic data exceeds a threshold, wherein the threshold is variable and dependent on a speed of the current traffic;
- a memory for storing a historic traffic database having historic traffic data associated with a time stamp;
- a processor;
- a global positioning system (GPS) for obtaining a current location of the apparatus;
- a program operably coupled to the memory and the receiver, wherein the program, when executed by the processor, provides current traffic conditions for the current location when the traffic message is received by the receiver by combining the traffic delta in the traffic message with the historic traffic data having a time stamp corresponding to a current time in the historic traffic database and provides the historic traffic data in the historic traffic database when the traffic message is not received by the receiver; and
- a user interface operably coupled to the program for displaying the current traffic conditions and the historic traffic data to a user.

8. The apparatus according to claim 7, wherein the apparatus is a navigation system.

9. A method comprising:
- obtaining a current location of a vehicle from a global positioning system (GPS);
- selecting, by a processor, current traffic data for the current location of the vehicle;
- selecting, by the processor, historical traffic data for the current location of the vehicle;
- comparing, by the processor, the current traffic data to the historical traffic data to determine a traffic delta;
- comparing, by the processor, the traffic delta to a threshold, wherein the threshold is variable depending on a speed of the current traffic data or a speed limit for the current location of the vehicle;
- when the traffic delta exceeds the threshold dependent on the speed of the current traffic data, generating a traffic message including the traffic delta; and
- sending the traffic message to one or more user devices.

10. The method of claim 9, wherein the traffic message uses any one or more selected from a group of an Alert-C protocol, Alert-Plus protocol, packet-based protocol, and Vehicle Information and Communication System message protocol.

* * * * *